United States Patent

Mukaiya

Patent Number: 4,770,510
Date of Patent: Sep. 13, 1988

[54] ZOOM LENS

[75] Inventor: Hitoshi Mukaiya, Saitama, Japan

[73] Assignee: Canon Kabushiki Kaisha, Tokyo, Japan

[21] Appl. No.: 106,430

[22] Filed: Oct. 9, 1987

[30] Foreign Application Priority Data

Oct. 15, 1986 [JP] Japan .................... 61-244690

[51] Int. Cl.$^4$ ............................................. G02B 15/16
[52] U.S. Cl. ........................................ 350/427; 350/423
[58] Field of Search ................................. 350/423, 427

[56] References Cited

U.S. PATENT DOCUMENTS

| | | | |
|---|---|---|---|
| 4,572,620 | 2/1986 | Kikuchi | 350/427 |
| 4,621,905 | 11/1986 | Kato et al. | 350/427 |
| 4,699,474 | 10/1987 | Ozawa | 350/427 |
| 4,720,181 | 1/1988 | Hata | 350/427 |

Primary Examiner—John K. Corbin
Assistant Examiner—Scott J. Sugarman
Attorney, Agent, or Firm—Fitzpatrick, Cella, Harper & Scinto

[57] ABSTRACT

A zoom lens comprising, from front to rear, a first lens component for focusing having a positive refractive power, a second lens component for variation of the image magnification having a negative refractive power, a third lens component for compensation to move in unison with the second lens component, and a rear lens part having a positive refractive power, wherein the first lens component includes, from front to rear, a cemented lens $I_1$ of two elements of negative and positive powers and a meniscus-shaped lens $I_2$ of forward convexity having a positive refractive power, and the zoom lens satisfies the following conditions:

$$0.095 < |\beta_{IIW} \cdot \beta_{IIIW}|/\sqrt{Z} < 0.106$$

where $\beta_{IIW} < 0$, $\beta_{IIIW} > 0$, $$2.15 < |F_{I1}/F_{I2}| < 2.8$$

where $\beta_{IIW}$ and $\beta_{IIIW}$ are the magnifications of the second and the third lens components respectively, Z is the zoom ratio, and $F_{I1}$ and $F_{I2}$ are the focal lengths of the lens $I_1$ and the lens $I_2$ respectively.

4 Claims, 6 Drawing Sheets

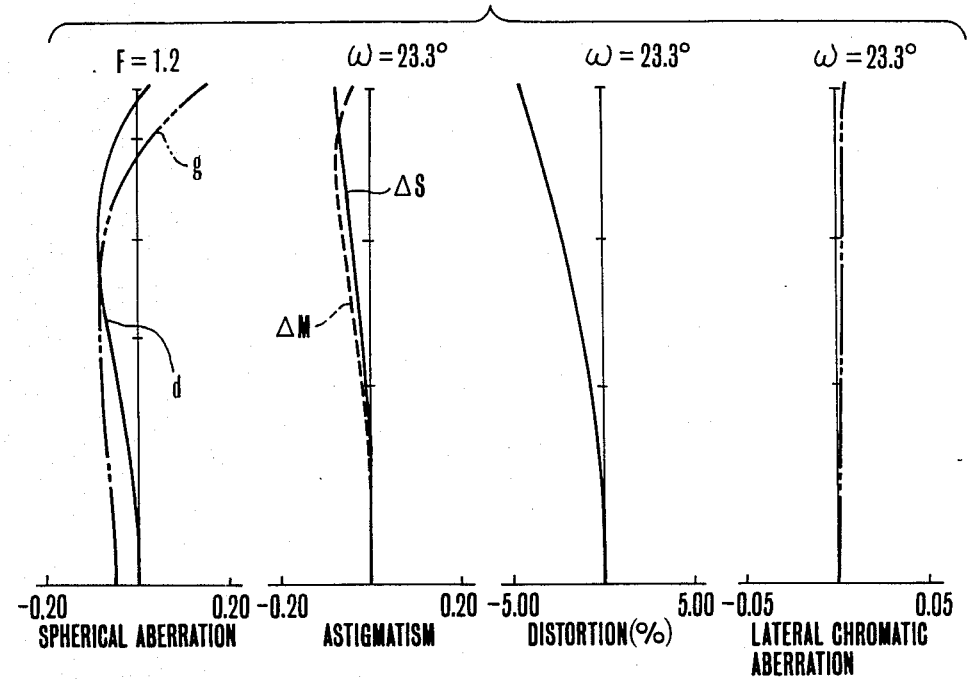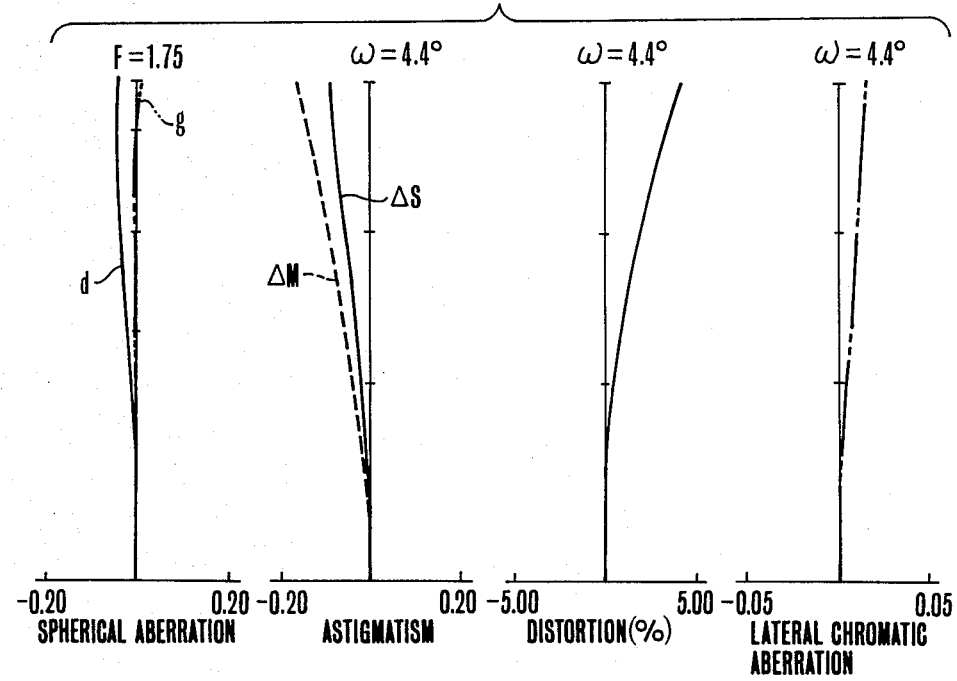

ZOOM LENS

BACKGROUND OF THE INVENTION

1. Field of the Invention

This invention relates to zoom lenses, and more particularly to zoom lenses of high relative aperture but, nevertheless good optical performance throughout the entire zooming range, and which are suited to photographic cameras or video cameras.

2. Description of the Related Art

The photographic camera, video camera and like ones have had a trend of demanding compact zoom lenses of large relative aperture and high range with high optical performance.

Of these, the video camera, because of its image pickup element being relatively low in sensitivity, should be equipped with a zoom lens of as large an aperture ratio as possible.

At present, the ⅔ inch image pickup tube is widely used in the video cameras because of their compactness and image quality. Also, from points of view of improving the managability and facilitating minimization of the bulk and size, 8 mm video cameras coming into increasing use. For the image pickup tube to be used in them, a further advance in the minimization of the size is required without sacrificing the image quality. Presently, ½ inch tubes and ½ inch image pickup boards are being employed.

In the video camera using the ⅔ inch tube, the speed of the zoom lens has not necessarily been more than F/1.4. But, when the ½ inch tube is used, because the area of the image pickup surface is nearly halved as compared with the ⅔ inch tube, the required speed for the zoom lens must be not slower than F/1.2.

Such a high relative aperture zoom lens has been proposed in, for example, Japanese Laid-Open Patent Application No. Sho 60-51813 (USP No. 4,621,905).

In general, in the called 4-component zoom lens, to achieve a large aperture ratio of about F/1.2, it becomes necessary to set forth so proper lens forms for the zoom section and the image forming section arranged on the image side of the zoom section to be stationary during zooming so that the residual aberrations of the zooming section are well corrected.

Also, to achieve a shortening of the total length of the lens, a minimization of the size of the first lens component counting from the front is advantageous. Yet, it also becomes important to set forth a proper lens form for the image forming section.

However, if the minimization of the size of the entire lens system and the increase of the aperture ratio are based merely on the strengthening of the refractive power of each lens component, spherical aberration in the paraxial region, coma in the marginal zone and higher order aberrations such as sagittal halo will largely be produced. Hence, it will become difficult to obtain a high optical performance.

For example, the strengthening of the refractive power of the first lens component for the purpose of achieving the minimization of the size leads to increase of overall image magnification of the other components in the zoom section and the image forming section. As a result, the first lens component produces too many aberrations, and the tolerances of the design factors becomes severe. Hence, it becomes very difficult to obtain a desired optical performance.

As examples of the related art, there are Japanese Laid-Open Patent Application Nos. Sho 60-208723 and Sho 60-260912.

SUMMARY OF THE INVENTION

An object of the present invention is to provide a zoom lens which, while the minimization of the entire lens system being achieved, is well corrected for high optical performance throughout the zooming range.

A concomitant object is to provide a zoom lens of an F-number of 11.2 and a zoom ratio of about 6.

The zoom lens of the invention comprises, from front to rear, a first lens component for focusing having a positive refractive power, a second lens component for variation of the image magnification having a negative refractive power, a third lens component for compensation to move in unison with the second lens component, and a rear lens part having a positive refractive power.

Here, the first lens component comprises, from front to rear, a lens $I_1$ consisting of two elements of negative and positive refractive powers cemented together, and a lens $I_2$ having a positive refractive power in the meniscus form convex toward the front. And, letting the magnifications of the second and third lens components in the wide angle end be denoted by $\beta_{IIW}$ and $\beta_{IIIW}$ respectively, the zoom ratio by Z, and the focal lengths of the lenses $I_1$ and $I_2$ by $F_{f1}$ and $F_{f2}$ respectively, the following conditions are satisfied:

$$0.095 < |\beta_{IIW} \cdot \beta_{IIIW}|/\sqrt{Z} < 0.106 \qquad (1)$$

where $\beta_{IIW} < 0$, $\beta_{IIIW} > 0$ $$2.15 < |F_{f1}/F_{f2}| < 2.8 \qquad (2)$$

BRIEF DESCRIPTION OF THE DRAWINGS

FIGS. 2(A) and 2(B) to FIGS. 6(A) and 6(B) are graphic representations of the various aberrations of numerical examples 1 to 5 of the invention respectively.

Of the graphs, FIGS. 2(A), 3(A), 4(A), 5(A) and 6(A) represent the aberrations in the wide angle end, and FIGS. 2(B), 3(B), 4(B), 5(B) and 6(B) represent the aberrations in the telephoto end. In the drawings, I, II, III, IV and V denote respectively the first, the second, the third, the fourth and the fifth lens components. ΔM is the meridional image surface; ΔS is the sagittal image surface; d is the d-line; g is the g-line; and SP is the stop.

DETAILED DESCRIPTION OF THE PREFERRED EMBODIMENTS

Figure 1:
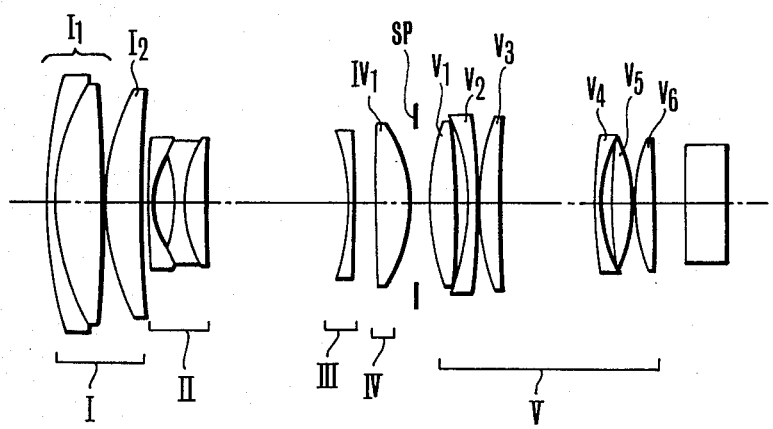
FIG. 1 is a longitudinal section view of a numerical example of a zoom lens of the invention.
Figure 3A:
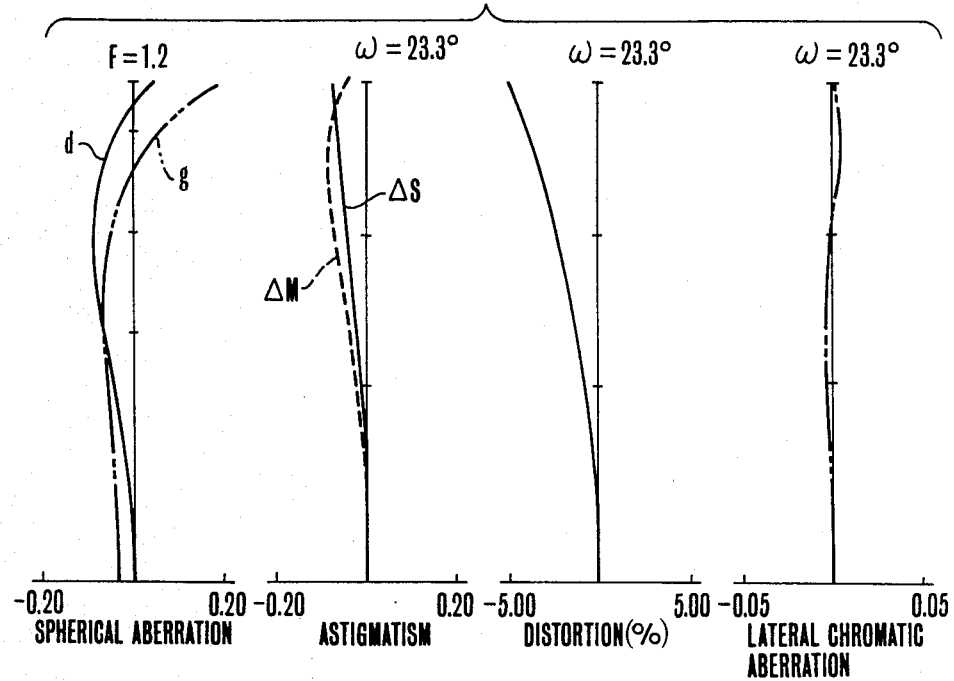
Figure 3B:
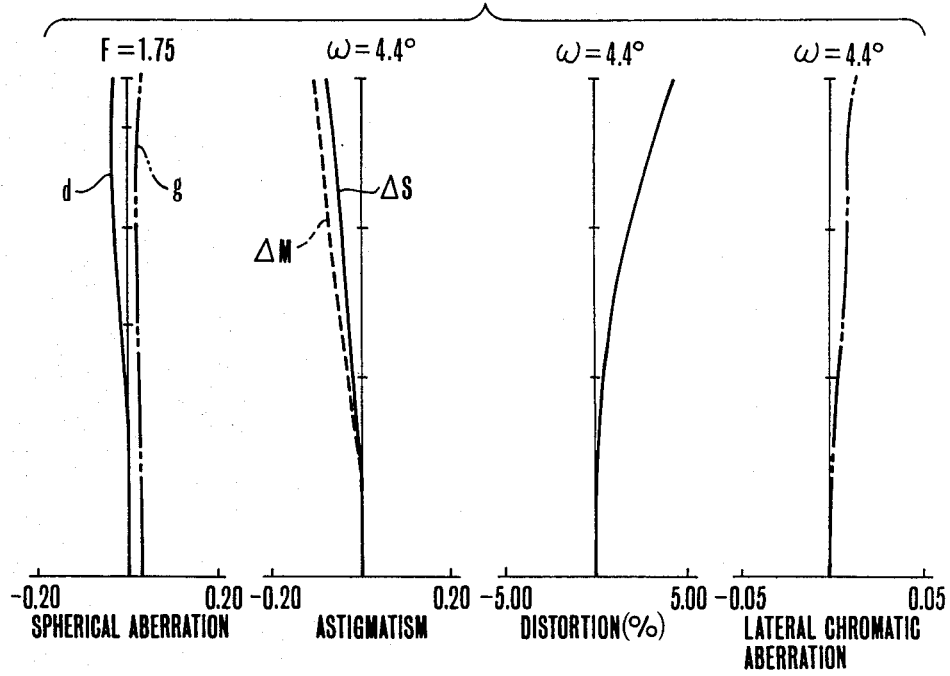
Figure 4A:
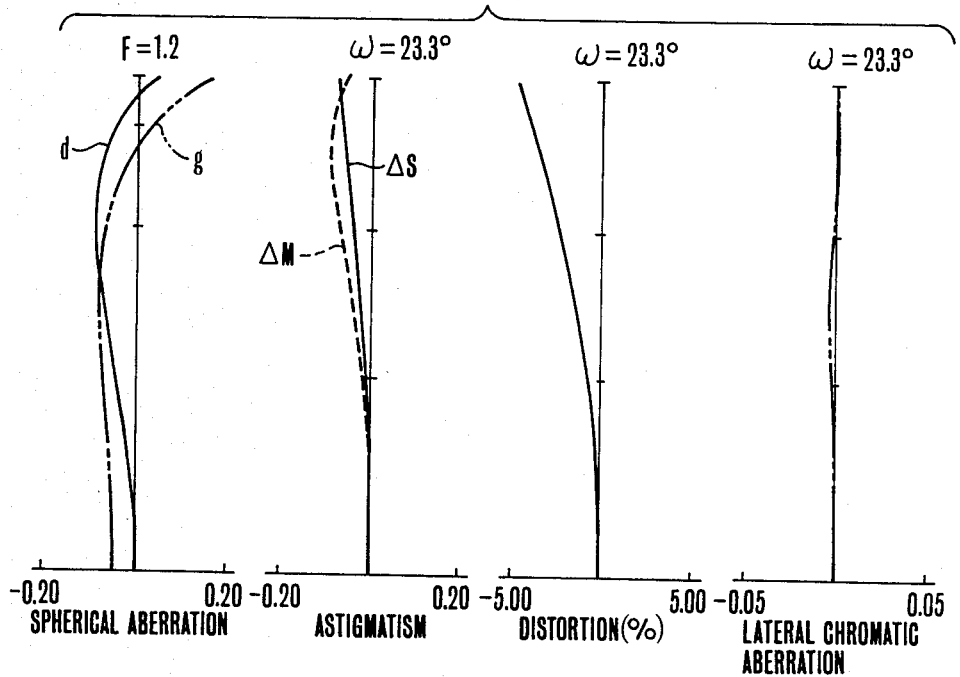
Figure 4B:
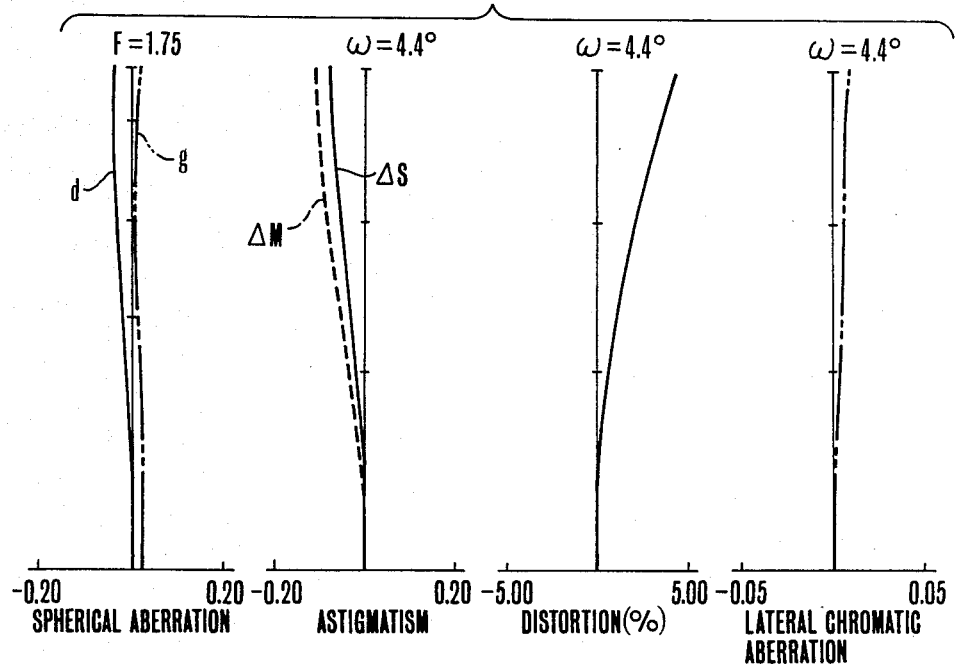
Figure 5A:
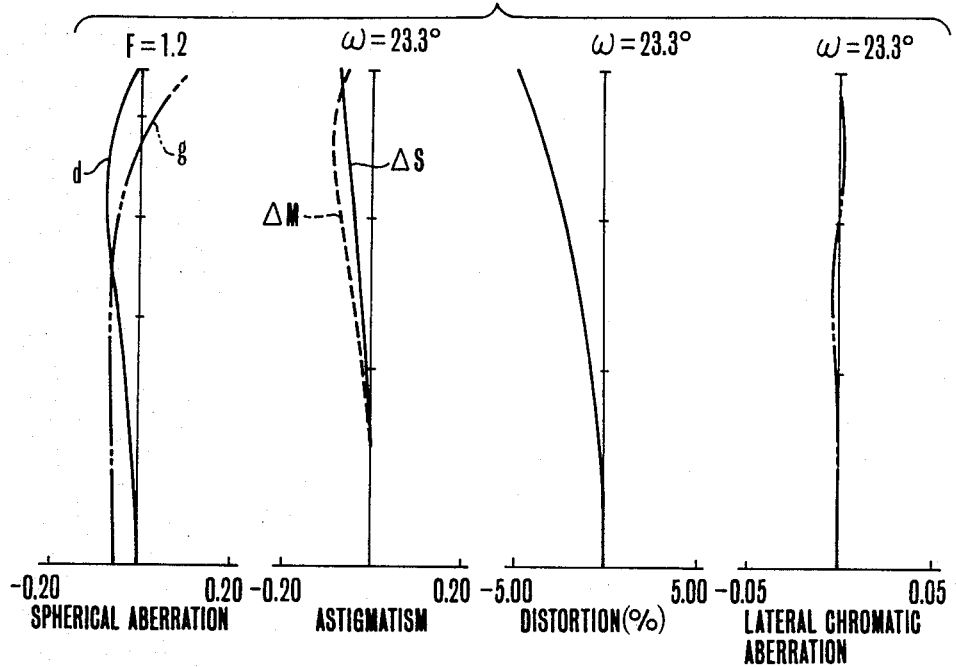
Figure 5B:
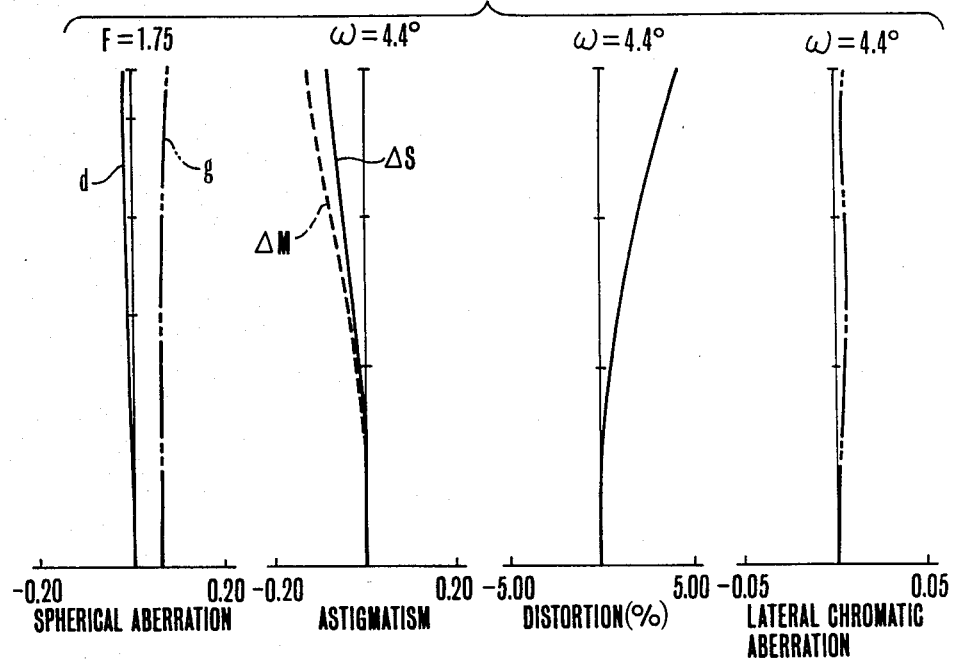
Figure 6A:
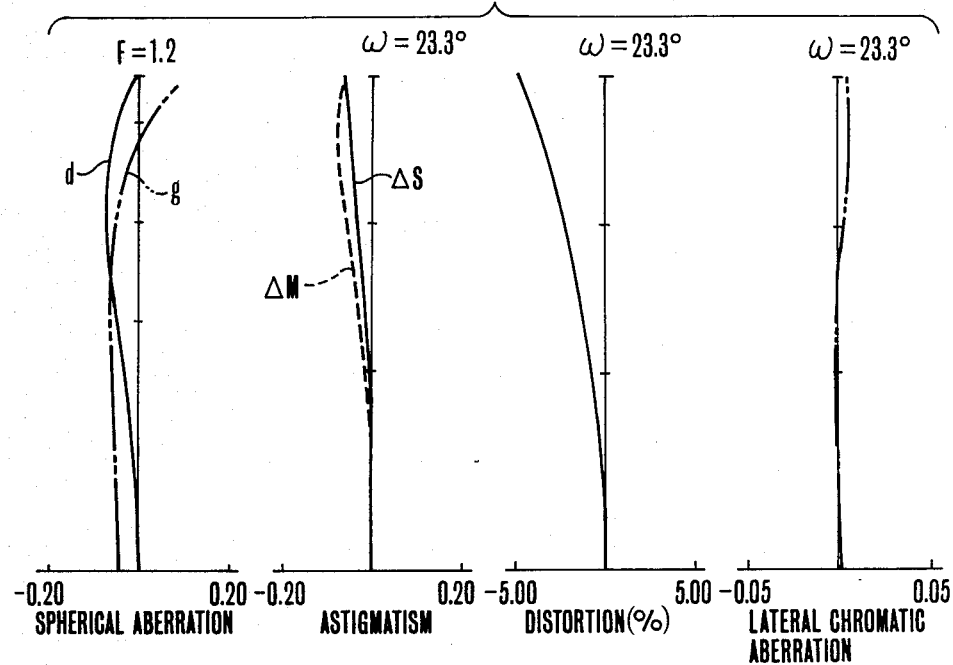
Figure 6B:
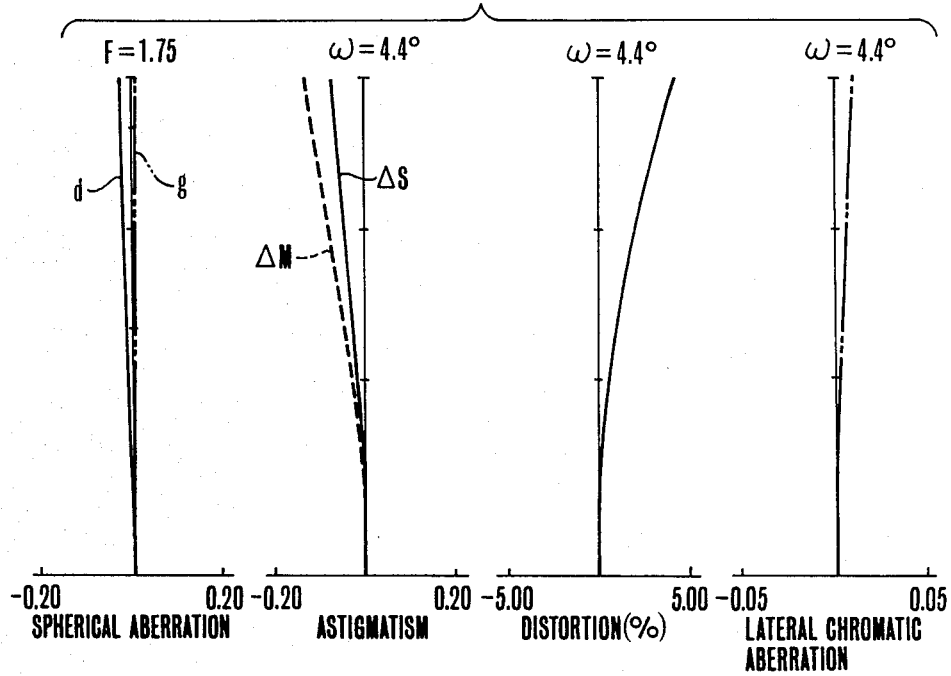

In FIG. 1, there is shown an example 1 of the specific zoom lens of the invention comprising, fron front to rear, a first lens component I of positive refractive power for focusing, a second lens component II of negative refractive power for variation of the image magnification, a third lens component III of negative refractive power for compensating for the image shift resulting from the variation of the image magnification, a fourth lens component IV of positive refractive power receptive of the divergent light beam from the third lens component III for producing an almost parallel light beam, and a fixed fifth lens component V having the image forming function. SP is a fixed stop.

In this embodiment, in such a zoom type, the lens configuration of the first lens component I is set forth as has been described above, and is made to satisfy the inequalities of condition (2), and further the magnifications $\beta_{IIW}$ and $\beta_{IIIW}$ of the second and third lens components II and III respectively are made to satisfy the inequalities of condition (1), thereby the aperture ratio and the zooming range are increased in such a manner that all aberrations are well corrected for high optical performance over the entire zooming range.

In the past, in the zoom lens whose zoom ratio is about 6, the value of the overall magnification $|\beta_{IIW} \cdot \beta_{IIIW}|$ of the second and third lens components, or the magnification of the so-called zoom section, in the wide angle end in relation to the zoom ratio Z was made relatively small.

This is because in the telephoto end there is need to make the value of magnification of the zoom section larger than in the wide angle end by a corresponding amount to the zoom ratio. The increase of the magnification of the zoom section in the wide angle end, therefore, calls for a further increase of the magnification of the zoom section in the telephoto end, which is unfavorable to aberration correction. In other words, the balance of the refractive powers of the first lens component for focusing and the fourth lens component for image formation is broken to increase the difficulty of shortening the total length of the lens and well correcting aberrations.

So, in the embodiment of the invention, the first lens component I is made up of a doublet $I_1$ consisting of negative and positive elements cemented together, and a positive meniscus-shaped singlet $I_2$ convex toward the front, and further the refractive powers of the doublet $I_1$ and the singlet $I_2$ are made to satisfy the condition (2). And, the image magnification of the zoom section is made to satisfy the condition (1) under that condition (2). In this way, the shortening of the total length of the entire lens system is achieved, and further the effective diameter of the lens is reduced, while the aberrations at an aperture ratio of about F/1.2 are well corrected. Thus, a high relative aperture high performance zoom lens is achieved.

When the magnification of the zoom section becomes too large beyond the upper limit of the inequalities of condition (1), the magnification at the telephoto end becomes too large, and the negative refractive power of the zoom section increases with increase of the Petzval sum to the negative direction so that the curvature of field is deteriorated. Therefore, it becomes more difficult to correct aberrations well over the entire zooming range. Conversely when the magnification of the zoom section becomes too small beyond the lower limit, the total movement of the zoom section increases, and the total length of the lens becomes long. It becomes, therefore, difficult to minimize the size of the entire lens system.

When the refractive power of the doublet $I_1$ becomes too small beyond the upper limit of the inequalities of condition (2), the rear principal point of the first lens component shifts too much toward the rear, thus coming to mechanically interfere with the second lens component. Also, the overall focal length of the first lens component becomes too short, causing the share of magnification of the zoom section to increase objectionably. When the lower limit is exceeded, on the other hand, because the rear principal point of the first lens component shifts forward, the focal length of the first lens component becomes large, causing the total length of the lens to increase objectionably.

Although the zoom lens the present invention aims at is achieved by satisfying the above-described conditions, to achieve a further improvement of the aberration correction, the fourth and fifth lens components are preferably constructed as follows:

The fourth lens component IV comprises a positive lens $IV_1$ turning the strong refracting surface toward the rear. The fifth lens component V comprises six lenses, or, from front to rear, a bi-convex lens $V_1$ turning the strong refracting surface toward the front, a negative meniscus lens $V_2$ turning the concave curvature toward the front, a positive lens $V_3$ turning the strong refracting surface toward the front, a negative meniscus lens $V_4$ turning the convex curvature toward the front, a bi-convex lens $V_5$ turning the strong refracting surface toward the rear, and a positive lens $V_6$ turning the strong refracting surface toward the front.

For note, the term "strong refracting surface toward the rear" herein used means that the curvature of the rear surface is stronger than that of the front one. The same is applied to the term "strong refracting surface toward the front".

In this embodiment, by designing the form and the construction and arrangement of the elements of the fourth and fifth lens components in such a way as described above, the residual aberrations of the zoom section, for example, spherical aberration and that inward coma which lies from the intermediate to the marginal zone are corrected in good balance throughout.

Also, in this embodiment, to improve the balance of aberration correction, concerning the i-th lens component and letting the radius of curvature of the j-th lens surface be denoted by $R_{i,j}$, the Abbe number of the glass of the j-th lens element by $\nu_{i,j}$, and the overall focal length by $F_i$, the following conditions are satisfied:

$$0.6 < |R_{4,2}/F_4| < 0.8 \tag{3}$$

where $R_{4,2} < 0$, $$1.3 < |R_{5,1}/R_{5,3}| < 1.6 \tag{4}$$

where $R_{5,1} > 0$, $R_{5,3} < 0$ $$0.65 < |R_{5,8}/F_5| < 0.8 \tag{5}$$

$$1.9 < R_{5,9}/F_5 < 2.5 \tag{6}$$

where $R_{5,9} > 0$ $$52 < (\nu_{5,1} + \nu_{5,3})/2 \tag{7}$$

The inequalities of condition (3) concern the refractive power of the rear surface of the lens $IV_1$. Under such a form of the lens $IV_1$ that the curvature of its rear surface is stronger as has been described above, the light beam passing through the first to the third lens component and emerging divergently of the third lens component are made refracted to an almost parallel light beam without causing the various aberrations, particularly spherical aberration and coma, to be produced as far as possible, before it enters the fifth lens component.

Also, the refractive power of the fourth lens component is unequivocally determined in order to make almost parallel the divergent light beam of the third lens component. For this reason, when the refractive power of the rear lens surface becomes too weak beyond the upper limit of the inequalities of condition (3), because the refractive power of the front surface has to be increased by an equivalent to that excess, the spherical aberration tends to be under-corrected. When the refractive power of the rear lens surface becomes too strong beyond the lower limit, on the other hand, large coma is produced.

The inequalities of condition (4) represent a range for the refractive power ratio of the front lens surfaces of the lenses $V_1$ and $V_2$ to well correct mainly spherical aberration. When the upper limit is exceeded, the spherical aberration becomes over-corrected. When the lower limit is exceeded, under-correction of it results.

The inequalities of condition (5) represents a range for the refractive power of the rear surface of the lens $V_4$ to well correct spherical aberration in cooperation with the condition (4). When the upper limit is exceeded, the spherical aberration becomes under-corrected. When the lower limit is exceeded, over-correction of it results.

The inequalities of condition (6) represent a range for the refractive power of the front surface of the lens $V_5$ to well correct mainly coma and astigmatism. When the upper limit is exceeded, the astigmatism is intensified. When the lower limit is exceeded, the coma is largely increased.

The inequality of condition (7) is concerned with the mean value of the dispersions of light rays of the glasses of the lenses $V_1$ and $V_3$. When the Abbe number becomes too small beyond the limit, longitudinal chromatic aberation becomes difficult to correct.

Five examples of specific zoom lenses of the invention can be constructed in accordance with the numerical data in the following tables for the radii of curvature, R, the axial thicknesses or air separations, D, and the reflective indices, N, and Abbe numbers, $\nu$, of the glasses of the lens elements with the subscripts numbered consecutively from front to rear.

The values of the factors in the above-defined inequalities of conditions for these numerical examples are listed in Table-1.

Numerical Example 1:

$F = 1\text{-}5.6 \quad FNO = 1\text{:}1.2\text{-}1.75 \quad 2\omega = 46.6°\text{-}8.8°$

| | | | |
|---|---|---|---|
| R1 = 6.729 | D1 = 0.129 | N1 = 1.80518 | $\nu$1 = 25.4 |
| R2 = 3.268 | D2 = 0.688 | N2 = 1.51633 | $\nu$2 = 64.1 |
| R3 = −14.013 | D3 = 0.016 | | |
| R4 = 2.899 | D4 = 0.494 | N3 = 1.60311 | $\nu$3 = 60.7 |
| R5 = 16.365 | D5 = Variable | | |
| R6 = 7.392 | D6 = 0.086 | N4 = 1.69680 | $\nu$4 = 55.5 |
| R7 = 1.249 | D7 = 0.371 | | |
| R8 = −1.614 | D8 = 0.086 | N5 = 1.69680 | $\nu$5 = 55.5 |
| R9 = 1.614 | D9 = 0.311 | N6 = 1.84666 | $\nu$6 = 23.9 |
| R10 = 14.619 | D10 = Variable | | |
| R11 = −2.968 | D11 = 0.086 | N7 = 1.71300 | $\nu$7 = 53.8 |
| R12 = −54.150 | D12 = Variable | | |
| R13 = 23.923 | D13 = 0.473 | N8 = 1.71300 | $\nu$8 = 53.8 |
| R14 = −2.192 | D14 = 0.107 | | |
| R15 = Stop | D15 = 0.215 | | |
| R16 = 3.691 | D16 = 0.387 | N9 = 1.65844 | $\nu$9 = 50.9 |
| R17 = −7.849 | D17 = 0.178 | | |
| R18 = −2.464 | D18 = 0.107 | N10 = 1.80518 | $\nu$10 = 25.4 |
| R19 = −10.541 | D19 = 0.016 | | |
| R20 = 2.981 | D20 = 0.301 | N11 = 1.60311 | $\nu$11 = 60.7 |
| R21 = 39.216 | D21 = 1.374 | | |
| R22 = 4.951 | D22 = 0.086 | N12 = 1.80518 | $\nu$12 = 25.4 |
| R23 = 1.792 | D23 = 0.132 | | |
| R24 = 5.722 | D24 = 0.333 | N13 = 1.51633 | $\nu$13 = 64.1 |
| R25 = −2.313 | D25 = 0.016 | | |
| R26 = 2.092 | D26 = 0.311 | N14 = 1.51633 | $\nu$14 = 64.1 |
| R27 = −12.884 | D27 = 0.430 | | |
| R28 = ∞ | D28 = 0.591 | N15 = 1.51633 | $\nu$15 = 64.1 |
| R29 = ∞ | | | |

-continued

Numerical Example 1:

| | W | T |
|---|---|---|
| D5 | 0.124 | 2.064 |
| D10 | 2.0903 | 0.3422 |
| D12 | 0.3156 | 0.1235 |

Numerical Example 2:

$F = 1\text{-}5.6 \quad FNO = 1\text{:}1.2\text{-}1.75 \quad 2\omega = 46.6°\text{-}8.8°$

| | | | |
|---|---|---|---|
| R1 = 6.759 | D1 = 0.129 | N1 = 1.80518 | $\nu$1 = 25.4 |
| R2 = 3.266 | D2 = 0.688 | N2 = 1.51633 | $\nu$2 = 64.1 |
| R3 = −13.961 | D3 = 0.016 | | |
| R4 = 2.894 | D4 = 0.494 | N3 = 1.60311 | $\nu$3 = 60.7 |
| R5 = 16.367 | D5 = Variable | | |
| R6 = 7.739 | D6 = 0.086 | N4 = 1.69680 | $\nu$4 = 55.5 |
| R7 = 1.253 | D7 = 0.371 | | |
| R8 = −1.610 | D8 = 0.086 | N5 = 1.69680 | $\nu$5 = 55.5 |
| R9 = 1.611 | D9 = 0.311 | N6 = 1.84666 | $\nu$6 = 23.9 |
| R10 = 15.414 | D10 = Variable | | |
| R11 = −2.964 | D11 = 0.086 | N7 = 1.71300 | $\nu$7 = 53.8 |
| R12 = −52.750 | D12 = Variable | | |
| R13 = 23.333 | D13 = 0.473 | N8 = 1.69680 | $\nu$8 = 55.5 |
| R14 = −2.152 | D14 = 0.107 | | |
| R15 = Stop | D15 = 0.215 | | |
| R16 = 3.640 | D16 = 0.387 | N9 = 1.65844 | $\nu$9 = 50.9 |
| R17 = −7.611 | D17 = 0.178 | | |
| R18 = −2.456 | D18 = 0.107 | N10 = 1.80518 | $\nu$10 = 25.4 |
| R19 = −10.777 | D19 = 0.016 | | |
| R20 = 2.975 | D20 = 0.301 | N11 = 1.60311 | $\nu$11 = 60.7 |
| R21 = 35.225 | D21 = 1.369 | | |
| R22 = 4.946 | D22 = 0.086 | N12 = 1.80518 | $\nu$12 = 25.4 |
| R23 = 1.789 | D23 = 0.132 | | |
| R24 = 5.750 | D24 = 0.333 | N13 = 1.51633 | $\nu$13 = 64.1 |
| R25 = −2.308 | D25 = 0.016 | | |
| R26 = 2.092 | D26 = 0.311 | N14 = 1.51633 | $\nu$14 = 64.1 |
| R27 = −12.770 | D27 = 0.430 | | |
| R28 = ∞ | D28 = 0.591 | N15 = 1.51633 | $\nu$15 = 64.1 |
| R29 = ∞ | | | |

| | W | T |
|---|---|---|
| D5 | 0.1269 | 2.067 |
| D10 | 2.088 | 0.340 |
| D12 | 0.313 | 0.121 |

Numerical Example 3:

$F = 1\text{-}5.6 \quad FNO = 1\text{:}1.2\text{-}1.75 \quad 2\omega = 46.6°\text{-}8.8°$

| | | | |
|---|---|---|---|
| R1 = 6.810 | D1 = 0.129 | N1 = 1.80518 | $\nu$1 = 25.4 |
| R2 = 3.265 | D2 = 0.688 | N2 = 1.51633 | $\nu$2 = 64.1 |
| R3 = −13.929 | D3 = 0.016 | | |
| R4 = 2.877 | D4 = 0.494 | N3 = 1.60311 | $\nu$3 = 60.7 |
| R5 = 16.142 | D5 = Variable | | |
| R6 = 8.829 | D6 = 0.086 | N4 = 1.69680 | $\nu$4 = 55.5 |
| R7 = 1.249 | D7 = 0.371 | | |
| R8 = −1.617 | D8 = 0.086 | N5 = 1.69680 | $\nu$5 = 55.5 |
| R9 = 1.647 | D9 = 0.311 | N6 = 1.84666 | $\nu$6 = 23.9 |
| R10 = 19.562 | D10 = Variable | | |
| R11 = −2.936 | D11 = 0.086 | N7 = 1.71300 | $\nu$7 = 53.8 |
| R12 = −38.498 | D12 = Variable | | |
| R13 = 21.969 | D13 = 0.483 | N8 = 1.69680 | $\nu$8 = 55.5 |
| R14 = −2.181 | D14 = 0.107 | | |
| R15 = Stop | D15 = 0.215 | | |
| R16 = 3.638 | D16 = 0.376 | N9 = 1.63854 | $\nu$9 = 55.4 |
| R17 = −7.639 | D17 = 0.178 | | |
| R18 = −2.457 | D18 = 0.107 | N10 = 1.80518 | $\nu$10 = 25.4 |
| R19 = −7.876 | D19 = 0.016 | | |
| R20 = 2.999 | D20 = 0.301 | N11 = 1.60311 | $\nu$11 = 60.7 |
| R21 = 18.488 | D21 = 1.393 | | |
| R22 = 4.950 | D22 = 0.086 | N12 = 1.80518 | $\nu$12 = 25.4 |
| R23 = 1.791 | D23 = 0.132 | | |
| R24 = 5.712 | D24 = 0.333 | N13 = 1.51633 | $\nu$13 = 64.1 |
| R25 = −2.317 | D25 = 0.016 | | |
| R26 = 2.083 | D26 = 0.311 | N14 = 1.51633 | $\nu$14 = 64.1 |
| R27 = −12.419 | D27 = 0.430 | | |
| R28 = ∞ | D28 = 0.591 | N15 = 1.51633 | $\nu$15 = 64.1 |

-continued

Numerical Example 3:

R29 = ∞

|  | W | T |
|---|---|---|
| D5 | 0.13663 | 2.07658 |
| D10 | 2.080 | 0.33469 |
| D12 | 0.3077 | 0.11283 |

Numerical Example 4:

F = 1-5.6   FNO = 1:1.2-1.75   2ω = 46.6°-8.8°

| R1 = 7.470 | D1 = 0.129 | N1 = 1.80518 | ν1 = 25.4 |
|---|---|---|---|
| R2 = 3.339 | D2 = 0.688 | N2 = 1.51633 | ν2 = 64.1 |
| R3 = −11.535 | D3 = 0.016 | | |
| R4 = 2.809 | D4 = 0.494 | N3 = 1.60311 | ν3 = 60.7 |
| R5 = 14.059 | D5 = Variable | | |
| R6 = 6.826 | D6 = 0.086 | N4 = 1.69680 | ν4 = 55.5 |
| R7 = 1.240 | D7 = 0.371 | | |
| R8 = −1.576 | D8 = 0.086 | N5 = 1.69680 | ν5 = 55.5 |
| R9 = 1.620 | D9 = 0.322 | N6 = 1.84666 | ν6 = 23.9 |
| R10 = 16.384 | D10 = Variable | | |
| R11 = −3.168 | D11 = 0.086 | N7 = 1.69680 | ν7 = 55.5 |
| R12 = 55.988 | D12 = Variable | | |
| R13 = 32.126 | D13 = 0.483 | N8 = 1.71300 | ν8 = 53.8 |
| R14 = −2.137 | D14 = 0.107 | | |
| R15 = Stop | D15 = 0.215 | | |
| R16 = 3.800 | D16 = 0.387 | N9 = 1.65844 | ν9 = 50.9 |
| R17 = −7.744 | D17 = 0.178 | | |
| R18 = −2.469 | D18 = 0.107 | N10 = 1.80518 | ν10 = 25.4 |
| R19 = −11.113 | D19 = 0.016 | | |
| R20 = 2.817 | D20 = 0.301 | N11 = 1.58913 | ν11 = 61.0 |
| R21 = 43.421 | D21 = 1.398 | | |
| R22 = 4.926 | D22 = 0.086 | N12 = 1.80518 | ν12 = 25.4 |
| R23 = 1.793 | D23 = 0.132 | | |
| R24 = 5.745 | D24 = 0.333 | N13 = 1.51633 | ν13 = 64.1 |
| R25 = −2.317 | D25 = 0.016 | | |
| R26 = 2.100 | D26 = 0.311 | N14 = 1.51633 | ν14 = 64.1 |
| R27 = −12.874 | D27 = 0.430 | | |
| R28 = ∞ | D28 = 0.591 | N15 = 1.51633 | ν15 = 64.1 |
| R29 = ∞ | | | |

|  | W | T |
|---|---|---|
| D5 | 0.1382 | 2.07853 |
| D10 | 2.0793 | 0.3254 |
| D12 | 0.3093 | 0.1228 |

Numerical Example 5:

F = 1-5.6   FNO = 1:1.2-1.75   2ω = 46.6°-8.6°

| R1 = 7.045 | D1 = 0.129 | N1 = 1.80518 | ν1 = 25.4 |
|---|---|---|---|
| R2 = 3.319 | D2 = 0.688 | N2 = 1.51633 | ν2 = 64.1 |
| R3 = −12.773 | D3 = 0.016 | | |
| R4 = 2.849 | D4 = 0.494 | N3 = 1.60311 | ν3 = 60.7 |
| R5 = 14.786 | D5 = Variable | | |
| R6 = 7.577 | D6 = 0.086 | N4 = 1.69680 | ν4 = 55.5 |
| R7 = 1.232 | D7 = 0.371 | | |
| R8 = −1.575 | D8 = 0.086 | N5 = 1.69680 | ν5 = 55.5 |
| R9 = 1.615 | D9 = 0.322 | N6 = 1.84666 | ν6 = 23.9 |
| R10 = 21.237 | D10 = Variable | | |
| R11 = −3.220 | D11 = 0.086 | N7 = 1.69680 | ν7 = 55.5 |
| R12 = 67.339 | D12 = Variable | | |
| R13 = 25.881 | D13 = 0.483 | N8 = 1.71300 | ν8 = 53.8 |
| R14 = −2.178 | D14 = 0.107 | | |
| R15 = Stop | D15 = 0.215 | | |
| R16 = 3.765 | D16 = 0.376 | N9 = 1.63854 | ν9 = 55.4 |
| R17 = −7.882 | D17 = 0.178 | | |
| R18 = −2.445 | D18 = 0.107 | N10 = 1.80518 | ν10 = 25.4 |
| R19 = −11.361 | D19 = 0.016 | | |
| R20 = 2.979 | D20 = 0.301 | N11 = 1.65844 | ν11 = 50.9 |
| R21 = 35.597 | D21 = 1.397 | | |
| R22 = 4.981 | D22 = 0.086 | N12 = 1.80518 | ν12 = 25.4 |
| R23 = 1.803 | D23 = 0.132 | | |
| R24 = 5.727 | D24 = 0.333 | N13 = 1.51633 | ν13 = 64.1 |
| R25 = −2.322 | D25 = 0.016 | | |
| R26 = 2.098 | D26 = 0.311 | N14 = 1.51633 | ν14 = 64.1 |
| R27 = −12.730 | D27 = 0.430 | | |
| R28 = ∞ | D28 = 0.591 | N15 = 1.51633 | ν15 = 64.1 |
| R29 = ∞ | | | |

|  | W | T |
|---|---|---|
| D5 | 0.136 | 2.076 |
| D10 | 2.0697 | 0.3216 |
| D12 | 0.3129 | 0.12082 |

TABLE 1

| Factor | Numerical Example | | | | |
|---|---|---|---|---|---|
|  | 1 | 2 | 3 | 4 | 5 |
| $\|\beta_{IIW} \cdot \beta_{IIIW}\| / \sqrt{Z}$ | 0.10239 | 0.10239 | 0.10298 | 0.10118 | 0.10239 |
| $\|FI1/FI2\|$ | 2.54999 | 2.57242 | 2.61558 | 2.64784 | 2.56829 |
| $\|R4,2/F4\|$ | 0.77249 | 0.75526 | 0.75967 | 0.75598 | 0.76749 |
| $\|R5,1/R5,3\|$ | 1.49829 | 1.48233 | 1.48029 | 1.53903 | 1.53945 |
| $R5,8/F5$ | 0.66285 | 0.66188 | 0.66286 | 0.66097 | 0.66693 |
| $R5,9/F5$ | 2.11633 | 2.12655 | 2.11365 | 2.11775 | 2.11774 |
| $(\nu 5,1 + \nu 5,2)/2$ | 55.8 | 55.8 | 58.05 | 55.95 | 53.15 |

As has been described above, according to the present invention, it is possible to achieve a zoom lens of increased aperture ratio at a high zoom ratio, while still permitting a minimizations of the size of the entire lens system to be achieved in such a manner that a high optical performance is obtained, suited to be used in a photographic camera or video camera.

What is claimed is:

1. A zoom lens comprising, from front to rear,
a first lens component for focusing having a positive refractive power;
a second lens component for variation of the image magnification having a negative refractive power;
a third lens component for compensation to move in unison with said second lens component; and
a rear lens part having a positive refractive power,
wherein said first lens component includes, from front to rear, a cemented lens $I_1$ of two elements of negative and positive powers and a meniscus-shaped lens $I_2$ of forward convexity having a positive refractive power, and said zoom lens satisfies the following conditions:

$$0.095 < |\beta_{IIW} \cdot \beta_{IIIW}|/\sqrt{Z} < 0.106$$

where $\beta_{IIW} 0$, $\beta_{IIIW} > 0$, $$2.15 < |F_{I1}/F_{I2}| < 2.8$$

where $\beta_{IIW}$ and $\beta_{IIIW}$ are the magnifications of said second and said third lens components respectively, Z is the zoom ratio, and $F_{I1}$ and $F_{I2}$ are the focal lengths of said lens $I_1$ and said lens $I_2$ respectively.

2. A zoom lens according to claim 1, wherein said rear part comprises, from front to rear, a fourth lens component having a positive refractive power with its rear surface convex toward rear to make up an almost parallel light beam of the divergent light beam emerging from said third lens component, and a fifth lens component which fulfills the image forming function.

3. A zoom lens according to claim 2, wherein said fifth lens component comprises, from front to rear, a bi-convex lens $V_1$ whose front surface has a stronger curvature, a negative meniscus-shaped lens $V_2$ of forward concavity, a positive lens $V_3$ whose front surface has a stronger curvature, a negative meniscus-shaped lens $V_4$ of forward convexity, a bi-convex lens $V_5$ whose rear surface has a stronger curvature, and a positive lens $V_6$ whose front surface has a stronger curvature.

4. A zoom lens according to claim 3, satisfying the following conditions:

$$0.6 < |R_{4,2}/F_4| < 0.8 \ (R_{4,2} < 0)$$

$$1.3 < |R_{5,1}/R_{5,3}| 1.6 \ (R_{5,1} > 0, R_{5,3} < 0)$$

$$0.65 < R_{5,8}/F_5 < 0.8$$

$$1.9 < R_{5,9}/F_5 < 2.5 \ (R_{5,9} > 0)$$

$$52 < (\nu_{5,1} + \nu_{5,3})/2$$

wherein $R_{i,j}$ is the radius of curvature of the j-th lens surface in the i-th component, $\nu_{i,j}$ is the Abbe number of the glass of the j-th lens element, and $F_i$ is the focal length of the i-th lens component.

* * * * *

UNITED STATES PATENT AND TRADEMARK OFFICE
CERTIFICATE OF CORRECTION

PATENT NO. : 4,770,510
DATED : September 13, 1988
INVENTOR(S) : HITOSHI MUKAIYA

It is certified that error appears in the above-identified patent and that said Letters Patent is hereby corrected as shown below:

Column 1, line 7, "but," should read --but--;

line 21, "the" should be deleted;

line 23, "managability" should read --manageability--;

line 39, "called" should read --so-called--.

Column 2, line 11, "11.2" should read --1:1.2--;

line 55, "fron" should read --from--.

Column 5, line 29, "aberation" should read --aberration--;

line 34, "reflective" should read --refractive--.

UNITED STATES PATENT AND TRADEMARK OFFICE
CERTIFICATE OF CORRECTION

PATENT NO. : 4,770,510
DATED : September 13, 1988
INVENTOR(S) : HITOSHI MUKAIYA

It is certified that error appears in the above-identified patent and that said Letters Patent is hereby corrected as shown below:

<u>Column 8,</u> line 44, "minimizations" should read --minimization--;

line 65, "$\beta_{IIW} 0, \beta_{IIIW} > 0,$" should read --$\beta_{IIW} < 0, \beta_{IIIW} > 0,$--;

line 67, "$2.15 < |F_{11}/F_{12}| < 2.8$" should read --$2.15 < |F_{I1}/F_{I2}| < 2.8$--.

<u>Column 10,</u> line 8, "$1.3 < |R_{5,1}/R_{5,3}| \ 1.6 (R_{5,1} > 0, R_{5,3} < 0)$" should read --$1.3 < |R_{5,1}/R_{5,3}| < 1.6 (R_{5,1} > 0, R_{5,3} < 0)$--.

Signed and Sealed this

Twenty-seventh Day of June, 1989

Attest:

DONALD J. QUIGG

Attesting Officer

Commissioner of Patents and Trademarks